(12) United States Patent
Basham et al.

(10) Patent No.: US 11,036,889 B2
(45) Date of Patent: *Jun. 15, 2021

(54) EFFICIENT AUDITING OF DATA IN OBJECT STORAGE

(71) Applicant: International Business Machines Corporation, Armonk, NY (US)

(72) Inventors: Robert B. Basham, Aloha, OR (US); Joseph W. Dain, Vail, AZ (US); Edward H. W. Lin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,890

(22) Filed: May 21, 2019

(65) Prior Publication Data

US 2019/0272391 A1 Sep. 5, 2019

Related U.S. Application Data

(63) Continuation of application No. 14/869,817, filed on Sep. 29, 2015, now Pat. No. 10,395,061.

(51) Int. Cl.
*G06F 16/23* (2019.01)
*G06F 7/00* (2006.01)
*G06F 21/64* (2013.01)

(52) U.S. Cl.
CPC .......... *G06F 21/64* (2013.01); *G06F 16/2365* (2019.01)

(58) Field of Classification Search
CPC ........ G06F 16/11; G06F 16/122; G06F 16/18; G06F 16/21; G06F 21/64; G06F 16/2365

(Continued)

(56) References Cited

U.S. PATENT DOCUMENTS 10,395,061 B2 8/2019 Basham et al.
2005/0125384 A1* 6/2005 Gilfix ...................... G06F 16/10

(Continued)

FOREIGN PATENT DOCUMENTS

GB 2501436 A 10/2013
WO 2013110966 A1 8/2013

OTHER PUBLICATIONS

Onen et al., "D:C-7.2: Privacy Design Guidelines for Accountability Tools," Cloud Accountability Project, Seventh Framework Programme, May 31, 2014, pp. 1-78.

(Continued)

*Primary Examiner* — Raquel Perez-Arroyo
(74) *Attorney, Agent, or Firm* — Zilka-Kotab, P.C.

(57) ABSTRACT

A computer program product is provided for auditing data in object storage. The computer program product comprises a computer readable storage medium having program instructions embodied therewith. The program instructions executable by a processor to cause the processor to: send, by the processor, an object to an object storage system. A directive to audit the object is also sent to the object storage system by the processor. Furthermore, one or more additional directives are sent to the object storage system by the processor. Each of the one or more additional directives are independently selected from the group consisting of: a feedback directive to obtain feedback regarding a progress and/or a status of the audit; and a control directive to start, pause, or stop the audit.

19 Claims, 5 Drawing Sheets

(58) Field of Classification Search
USPC .......................................................... 707/694
See application file for complete search history.

(56) References Cited

U.S. PATENT DOCUMENTS

| | | | |
|---|---|---|---|
| 2007/0136814 A1* | 6/2007 | Lee ...................... | G06F 21/552 |
| | | | 726/25 |
| 2008/0244686 A1* | 10/2008 | Li .......................... | G06F 21/64 |
| | | | 726/1 |
| 2010/0180349 A1* | 7/2010 | Koohgoli ............ | G06F 16/2358 |
| | | | 726/30 |
| 2011/0126197 A1 | 5/2011 | Larsen et al. | |
| 2011/0197285 A1* | 8/2011 | Ginter .............. | H04N 21/25816 |
| | | | 726/27 |
| 2012/0179646 A1 | 7/2012 | Hinton et al. | |
| 2013/0086099 A1 | 4/2013 | Rolia et al. | |
| 2013/0091106 A1 | 4/2013 | Dubbels et al. | |
| 2013/0132718 A1* | 5/2013 | Agrawal .............. | H04L 9/3268 |
| | | | 713/158 |
| 2013/0291127 A1 | 10/2013 | Bergman et al. | |
| 2015/0100548 A1 | 4/2015 | Mc Erlean et al. | |
| 2015/0199367 A1* | 7/2015 | Hammer ............. | G06F 16/1748 |
| | | | 707/654 |
| 2017/0091233 A1 | 3/2017 | Basham et al. | |

OTHER PUBLICATIONS

Yawale et al., "Third Party Auditing For Secure Data Storage in Cloud through Trusted Third Party Auditor Using RC5," International Journal of Application of Innovation in Engineering & Management, vol. 3, Issue 3, Mar. 2014, pp. 493-497.
Basham et al., U.S. Appl. No. 14/869,817, filed Sep. 29, 2015.
Non-Final Office Action from U.S. Appl. No. 14/869,817, dated May 14, 2018.
Final Office Action from U.S. Appl. No. 14/869,817, dated Jan. 24, 2019.
Notice of Allowance from U.S. Appl. No. 14/869,817, dated Apr. 19, 2019.
List of IBM Patents Or Patent Applications Treated As Related.
Supplemental Notice of Allowance from U.S. Appl. No. 14/869,817, dated Jul. 9, 2019.

* cited by examiner

EFFICIENT AUDITING OF DATA IN OBJECT STORAGE

BACKGROUND

The present invention relates to cloud storage, and more particularly, this invention relates to auditing the integrity of data in cloud storage systems and networks.

Cloud storage is primarily comprised of object storage at massive scale. In some circumstances, it may be necessary to audit and check the health of containers and objects stored in a cloud storage service. However, object storage provides very little control over auditing data objects and containers stored in cloud storage by storage subsystems or applications.

In order for a storage subsystem or application to perform an audit of an object stored in an object storage service, the storage subsystem or application may need to perform a GET from the object storage service, which recalls the data from the cloud such that the storage subsystem or application can locally calculate a checksum and ensure that the calculated checksum matches an original checksum associated with the object. Performing the GET requires consuming network bandwidth between the storage subsystem or application and the cloud storage service, and it also requires consuming resources of the infrastructure running the storage subsystem or application.

Network bandwidth consumption may be one of the most expensive aspects of implementing cloud storage, and an audit that requires performing a GET of multiple objects is inefficient and may incur significant operational costs.

SUMMARY

A computer-implemented method, according to one embodiment, includes: sending an object to an object storage system. A directive to audit the object is also sent to the object storage system. Furthermore, one or more additional directives are sent to the object storage system. Each of the one or more additional directives are independently selected from the group consisting of: a feedback directive to obtain feedback regarding a progress and/or a status of the audit; and a control directive to start, pause, or stop the audit. Moreover, auditing the object includes: calculating a unique value based on contents of the object, and triggering an eventual consistency loop in response to a determination that the calculated unique value is not the same as an expected unique value. The eventual consistency loop includes: calculating additional unique values based on the contents of the object. The calculated unique value is compared to the additional unique values until determining: the calculated unique value is identical to one of the additional unique values, and/or an amount of time elapsed since determining the calculated unique value is not the same as the expected unique value is greater than a predetermined timeout threshold. Further still, the predetermined timeout threshold is based on: a maximum object size of the object storage system, and a longest time expected to elapse while writing the object having the maximum object size to the object storage system.

A computer program product for auditing data in object storage, according to another embodiment, includes a computer readable storage medium having program instructions embodied therewith. The program instructions executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

In various embodiments disclosed herein, a storage application may ensure that there are multiple valid copies of data stored in an object storage system of a cloud storage service. Further, by requesting the object storage system perform audits of the data, the storage application may ensure that the copies of data stored in the cloud storage service comply with policies defined for the data. Accordingly, the storage application may ensure the integrity of its data without utilizing valuable network bandwidth and local system resources.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of efficiently managing point in time copies of data in object storage.

In the embodiments disclosed herein, a storage application may ensure that there are multiple valid copies of its data stored in an object storage system of a cloud storage service. Further, the storage application may ensure that the copies of data stored in the cloud storage service comply with policies that it has defined for the data. Accordingly, the storage application may ensure the integrity of its data without wasting valuable network bandwidth and local system resources.

In one general embodiment, a computer program product is provided for auditing data in object storage. The computer program product comprises a computer readable storage medium having program instructions embodied therewith. The program instructions are executable by an object storage system to cause the object storage system to receive a directive to audit an object, and audit the object based on the directive. Additionally, the program instructions are executable by the object storage system to cause the object storage system to generate a result of the audit of the object.

In another general embodiment, a system is provided that comprises a memory and a processor configured for auditing data in object storage. Auditing the data in object storage comprises receiving, at an object storage system, a directive to audit an object, auditing the object based on the directive, and generating a result of the audit of the object.

In another general embodiment, a computer program product is provided for auditing data deleted from object storage. The computer program product comprises a computer readable storage medium having program instructions embodied therewith. The program instructions are executable by an object storage system to cause the object storage system to receive a directive to audit a deleted object. The program instructions are also executable by the object storage system to cause the object storage system to audit the deleted object based on the directive, and generate a result of the audit of the deleted object.

In another general embodiment, a system is provided that comprises a memory and a processor configured for auditing data deleted from object storage. Auditing the data deleted from object storage comprises receiving, at an object storage system, a directive to audit a deleted object, auditing the deleted object based on the directive, and generating a result of the audit of the deleted object.

In another general embodiment, a computer program product is provided for auditing data in object storage. The computer program product comprises a computer readable storage medium having program instructions embodied therewith. The program instructions are executable by a processor to cause the processor to send an object to an object storage system. Further, the program instructions are executable by the processor to cause the processor to send, by the processor to the object storage system, a directive to audit the object, and receive, by the processor, a result of the audit of the object.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
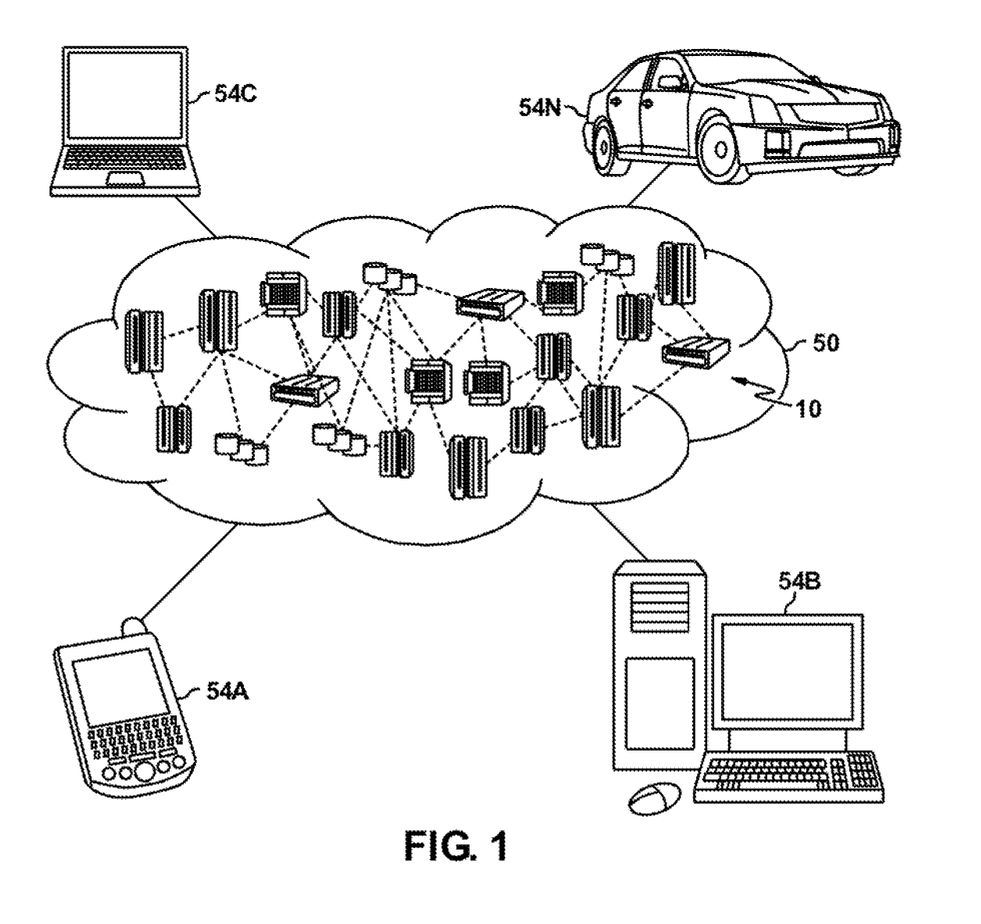
FIG. 1 depicts a cloud computing environment, according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
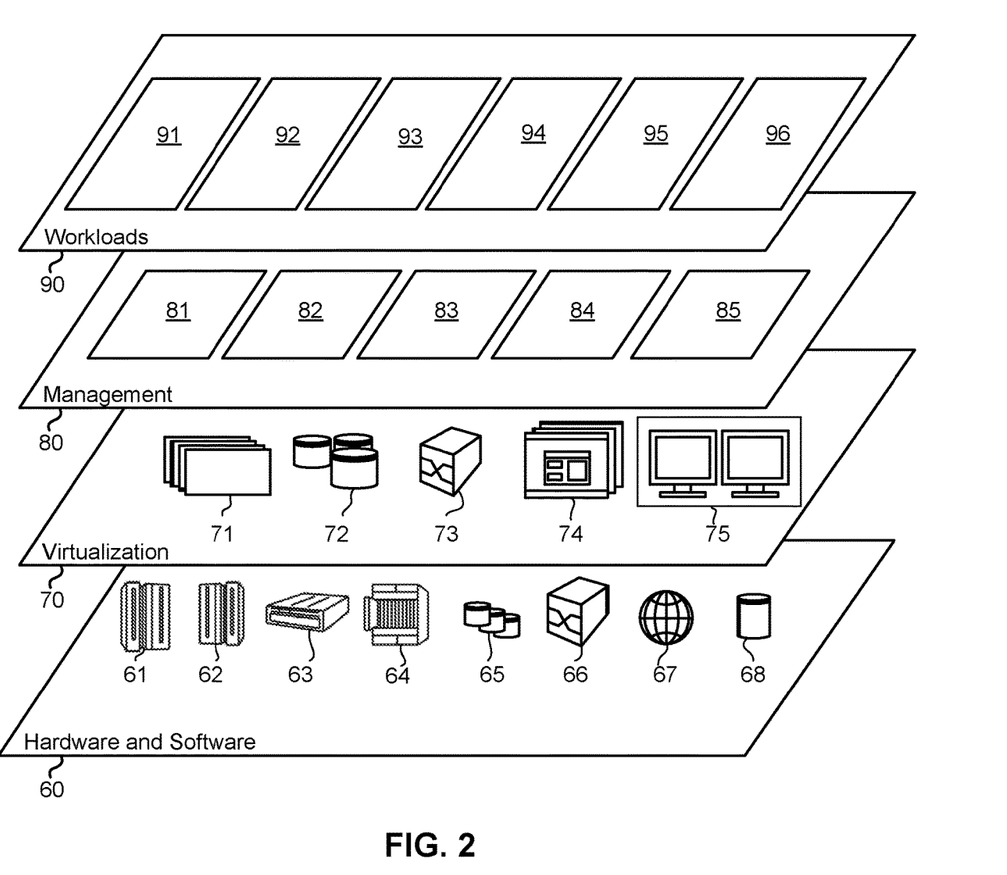
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and on-demand auditing of data in object storage 96.

Figure 3A:
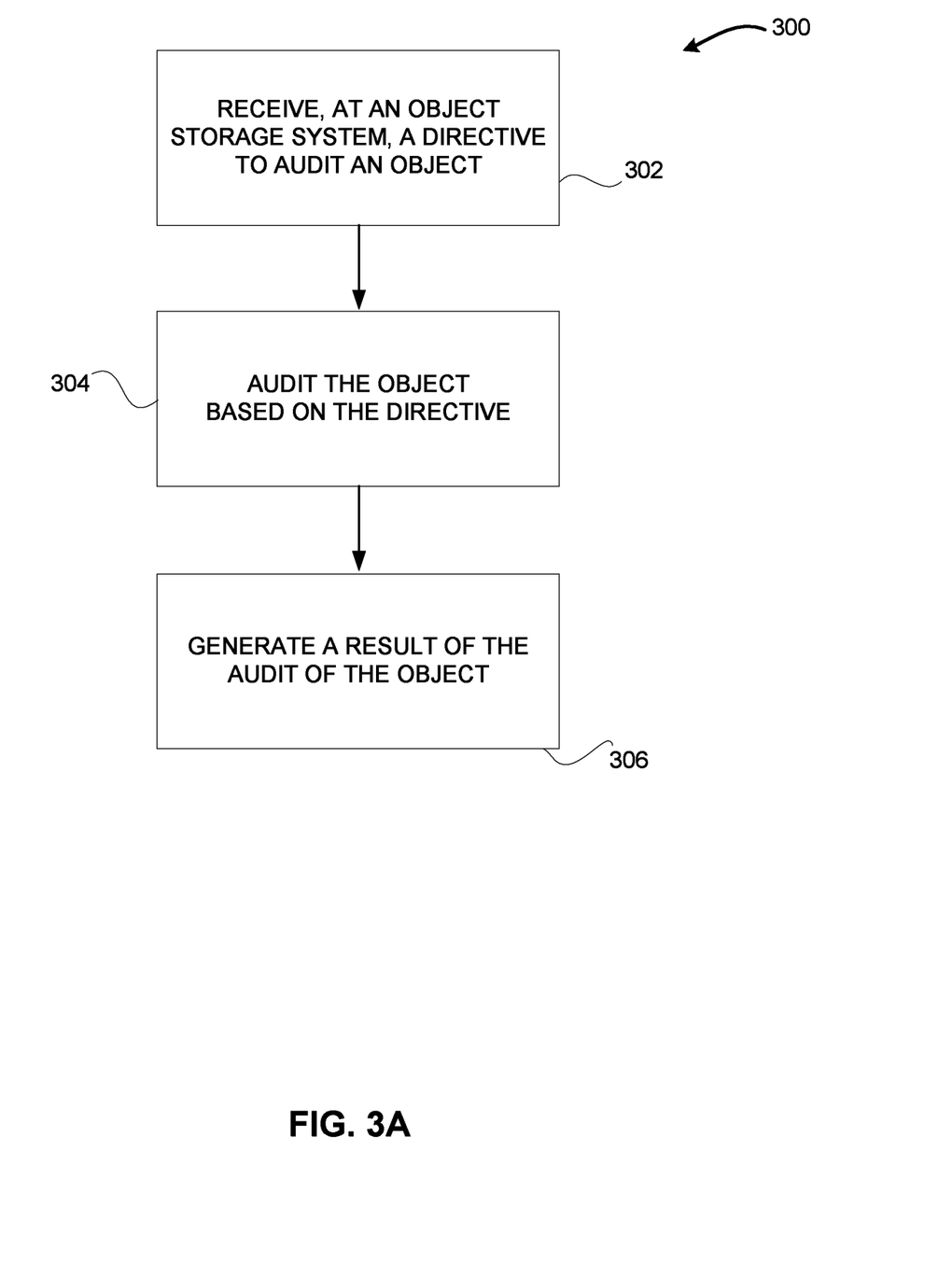
FIG. 3A depicts a method for auditing data in object storage, in accordance with an embodiment of the present invention.

Now referring to FIG. 3A, a flowchart of a method 300 for auditing data in object storage, is shown according to one embodiment. The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by an object storage system, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, method 300 initiates with operation 302, where an object storage system receives a directive to audit an object.

As used herein, the object storage system may comprise any entity that stores objects to a volume, retrieves objects from a volume, and/or deletes objects from a volume. The object storage system may include an object storage service or an object storage platform. For example, in some embodiments, the object storage system may be an on-premises object storage system. In other embodiments, the object storage system may be hosted by a third-party Internet Service Provider (ISP) or cloud provider, such as Amazon.com or SoftLayer, such that the object storage system is in the cloud. Still yet, the object storage system may include OpenStack Swift, and/or cloud infrastructure, such as SoftLayer Cloud. In one particular embodiment, the object storage system resides in SoftLayer of a clustered file system in the cloud, such as General Parallel File System (GPFS).

As used herein, an object is comprised of data and metadata associated with the data. Each object may be stored with one or more other objects within a container storage location, and each container storage location may be stored with one or more other container storage locations within an account storage location. Each account storage location may contain information about itself, and the container storage locations within the account storage location. Similarly, each container storage location may contain information about itself, and the objects stored within the container storage location.

Further, as used herein, a directive to audit an object may comprise a directive to audit a single object, a directive to audit a group of objects, a directive to audit one or more containers, or a directive to audit one or more accounts of the object storage system. Accordingly, any subsequent action (e.g., an audit, etc.) taken based on the directive may be directed to a single object, a group of objects, one or more containers, or one or more accounts, respectively.

In various embodiments, the audit directive may be received from a storage application. As used herein, the storage application may include any combination of software and hardware capable of sending the directive to the object storage system. The storage application may also be capable of storing objects to the object storage system, such as via HTTP PUT requests. The storage application may reside within a storage controller, a storage subsystem, a virtualized storage system, etc. In some embodiments, the storage application may include products such as IBM Storwize, IBM Spectrum Virtualize, IBM DS8000, IBM XIV, and IBM General Parallel File System (GPFS) Storage Server, etc.

In a particular embodiment, the storage application comprises block storage subsystems and/or file storage subsystems that use MCStore to move data in and out of the object storage system. Further, in such an embodiment, the object storage system may comprise a GPFS-based object storage service residing in the Softlayer Cloud environment.

The directive may be received at the object storage system in any suitable manner. In one embodiment, the directive may be communicated to the object storage system using a Representational State Transfer Application Programming Interface (REST API). For example, the directive may be communicated to the object storage system by a storage application setting custom metadata, utilizing a REST API, for one or more containers and/or one or more objects stored in the object storage system. Such metadata may be stored as extended attributes in a file system of the object storage system, such as GPFS. In other words, the directive may be found in object/container metadata. In such an embodiment, the object storage system may scan the metadata of stored objects, and audit the objects based on a directive in the metadata. Accordingly, a directive may comprise a lightweight metadata update that requires little network traffic for communication to the object storage system.

In another embodiment, the directive may be communicated to the object storage system using a document, such as an XML document. In yet another embodiment, the directive may be communicated to the object storage system using a socket interface that is separate from an object interface utilized to transfer objects to the object storage system.

As used herein, the directive to audit the object may include any command sent to the object storage system that instructs the object storage system to perform audit operations on one or more objects.

In one embodiment, the directive may be received as a one-time invocation. For example, an object, received at the object storage system from a storage application, may include metadata that instructs the object storage system to audit the object immediately. As another example, a storage application may access metadata of an object on an object storage system, and set an audit flag within the metadata. In response, the object storage system may audit the object. Using such techniques, the storage application may offload an on-demand audit process to the object storage system.

In another embodiment, the directive may provide an audit policy for one or more objects of the object storage system. For example, an audit policy may direct the object storage system to audit one or more objects, containers, or accounts, according to a predefined schedule (e.g., a regular interval of days, weeks, months, etc.). Additionally, an audit policy for an object may specify a minimum number of valid copies of the object that must be stored by the object storage system.

As an option, an audit policy may indicate circumstances for when an audit of an object is initiated. For example, an audit policy may instruct the auditing of an object when there is low incoming traffic to, and/or low outgoing traffic from, the object storage system. As another example, an audit policy may instruct the auditing of an object when CPU utilization at the object storage system falls below a specified threshold.

Still yet, the directive to audit the object may modify or delete a previously established audit policy. For example, where a previously received directive has established a policy for auditing an object, the directive to audit the object may instruct an increase in the frequency of audits of the object, or instruct a deletion of the established policy for auditing the object.

As an option, an audit policy may be established or modified to restrict when auditing of an object is allowed or precluded from occurring. For example, if a storage application is programmed to perform a regular activity that utilizes processing and/or network resources, such as batch operations on the cloud or a nightly point in time copy to the cloud, then a policy may be established to preclude the scheduling of audit operations during the regular activity. Accordingly, a storage application may provide an audit policy that prevents the auditing of its data during the replication of its point in time copies.

In some embodiments, the object storage system may keep a historical record of when a storage application performs regular activities, such as batch operations on the cloud or a nightly point in time copy to the cloud. The object storage system may utilize the historical record to perform heuristics and predict idle time periods. The object storage system may then schedule the performance of audit operations that comply with storage application-issued audit policies (e.g., every 3 months, 6 months, etc.) to occur during the relatively idle or reduced-usage time periods that have been heuristically predicted.

Accordingly, a directive received at an object storage system may control which objects are audited, when the objects are audited, and the circumstances for when an audit is initiated.

Next, at operation 304, the object is audited at the object storage system based on the directive. Auditing an object may include any operation that examines the object to determine consistency or corruption present in the object. In this manner, the directive to audit the object may result in an audit operation that determines the integrity of the object. As noted above, in one embodiment, the object may be audited due to a one-time invocation, where the object storage system performs the audit immediately in response to receiving the directive. Still yet, in another embodiment, the object may be audited based on an audit policy.

In various embodiments, the object storage system may store multiple copies of the object. For example, the object storage system may store the object in triplicate, such that the object is stored to three different physical media or sites managed by the object storage system. In embodiments wherein multiple copies of an object are stored, each of the copies of the object may be separately audited during operation 304 based on the directive received at operation 302.

In one embodiment, a directive received from a storage application at operation 302 may direct the object storage system to audit only specific copies of the object, such that not all stored copies of the object are audited. In other words, the directive from the storage application may instruct the object storage system to audit a specific copy of an object stored in the object storage system, but not any other copies of the object. As an option, the directive from the storage application may instruct the object storage system to audit the specific copy by specifying a site that the specific copy is stored at. In this way, the directive may specify a site-specific audit operation.

In one embodiment, the implementation of the object storage system may include storlets integration. By way of integrating storlets into the object storage system, functionality of the object storage system may be extended to allow code to be uploaded to the object storage system, and executed against object data without moving the object data to another location for processing. A storlet may be implemented as a single method Java interface that receives an object as input, audits the object according to the received directive, and then outputs a result. As an option, the storlet may be packaged in a docker container, and pushed to the object such that the object does not need to be moved to another system for auditing purposes.

In some embodiments, additional directives may be received at the object storage system. As an option, the additional directives may be received from a storage application that sent the directive to audit the object. The additional directives may include a directive to stop or pause a current audit operation. Accordingly, a storage application may control the auditing of an object by issuing start, pause, and/or stop audit directives to an object storage system, and an audit of the object may be started, paused, or stopped, respectively, based on the directives.

Moreover, in some embodiments, a directive from a storage application may instruct the object storage system to provide feedback regarding the status of an audit operation. An audit operation offloaded to the object storage system may not complete immediately, especially for a large audit operation that is directed to a large number of objects and/or objects that occupy a sizeable quantity of storage space. Further, because the object storage system may be remote from the storage application, the storage application may not readily obtain a status of such operations. Accordingly, a feedback directive may instruct the object storage system to return a status of an audit operation being performed based on a previously sent directive. As an option, such a feedback directive may result in the object storage system returning a status of a storlet that is performing the audit of the object.

For example, some time after a storage application has directed the object storage system to perform an audit of an object, the storage application may follow up with a feedback directive. In response to the feedback directive, the object storage system may return to the storage application a progress of the audit operation, and/or an estimated completion time of the audit operation.

Still yet, a result of the audit is generated at operation 306. In some embodiments, auditing the object may include an operation that calculates a unique value based on a contents of the object (e.g., data and metadata of the object, etc.). Such a unique value may otherwise be known as an object fingerprint. For example, auditing the object may include calculating a checksum for the object. As another example, auditing the object may include calculating a hash value or hash code for the object utilizing a hash function. Accordingly, a result of the audit may include a checksum, a hash value, hash code, etc. As an option, where multiple objects are audited (e.g., a group of objects, a container, etc.), the result of the audit may include a checksum, a hash value, or a hash code for each of the objects. Still yet, in embodiments wherein the object storage system stores multiple copies of each object, the result of the audit may include a checksum, a hash value, or a hash code for each of the copies of the object, such that the result includes a unique value for each object at each site.

In some embodiments, the result of the audit may include a result of comparing the unique value calculated based on the contents of the object with another unique value previously-calculated based on the contents of the object. In other words, the result of the audit may include the results of comparing a current checksum, hash value, or hash code of the object with a previously-calculated checksum, hash value, or hash code of the object.

In embodiments wherein the object storage system stores multiple copies of each object, the result of the audit may include, for each copy of an object, a result of comparing the unique value calculated based on the contents of a given copy of the object with another unique value previously-calculated based on the contents of the given copy of the object. Additionally, in such embodiments, the results may include verifying that the same unique value is calculated for each of the various copies of an object. In other words, the object storage system may ensure intra-site object consistency over time, as well as inter-site object consistency for the multiple distributed copies of a given object. In this manner, the integrity of each of the objects may be ensured, on an on-demand basis, across an object storage system.

In some circumstances, where a current unique value of an object is not the same as an expected unique value (i.e., a previously-calculated unique value, etc.), then the object may be suffering from one or more data abnormalities, such as corruption, missing objects, or bit rot, which may be caused by the decay of a physical storage medium the object is stored on.

However, in other circumstances, where a current unique value of an object is not the same as the expected unique value, then the object may be currently being written or modified. For example, if the object is currently being duplicated from a first site to a second site, then an audit of the object on the second site may result in a unique value of the object stored to the second site not matching an expected unique value (i.e., a previously-calculated unique value, a unique value calculated for the object stored to the first site, etc.).

Accordingly, when the current unique value of the object is not the same as the expected unique value, then an eventual consistency loop may be triggered at the object storage system. The eventual consistency loop may include calculating one or more additional unique values based on the contents of the object. For example, when the current unique value of the object is not the same as the expected unique value, then a second unique value may be calculated based on the contents of the object. The second unique value may be calculated immediately in response to determining that the current unique value of the object is not the same as the expected unique value, or after waiting a predetermined period of time.

Further, the current unique value may be compared to the one or more additional unique values. If the current unique value is different than the one or more additional unique values, then an active task affecting the object may be taking place. For example, the object may be undergoing a write, replication, modification, etc.

The eventual consistency loop may continue until subsequently calculated values of the one or more additional unique values are determined to be identical, or until a timeout. Once subsequently calculated values of the one or more additional unique values are determined to be identical (i.e., a stable value), the active task affecting the object may be finished. For example, the active task may have completed, stalled, or become corrupted. The stable value may then be compared to the expected unique value, to determine whether the object may be experiencing corruption, bit rot, etc.

As another option, the eventual consistency loop may timeout after a predetermined period of time. The predetermined period of time may be based on a characteristic of the object storage system. For example, the predetermined period of time may be based on a maximum object size of the object storage system. In particular, the maximum object size of the object storage system may be correlated to a worst-case scenario object write time. The worst-case scenario object write time may be the longest time expected to elapse during a write of an object having the maximum object size to the object storage system. Accordingly, a last calculated value may be calculated based on the contents of the object after the predetermined period of time, and the last calculated value may be compared to the expected unique value, to determine whether the values match. If the values do not match, the object may be experiencing corruption, bit rot, etc.

In some embodiments, the result of the audit may be transmitted and/or stored. For example, the result of the audit may be returned to a storage application that initiated the audit. The result of the audit may be returned by way of a REST API, a document (e.g., an XML document, etc.), or a socket interface.

As another example, the result of the audit may comprise a report stored as a new object within the object storage system. The report may be accessible to a storage application that initiated the audit of the object. As an option, the report may include a timestamp of the audit, as well as an outcome of the audit. Moreover, in embodiments where the audit is performed based on an audit policy, such a report may include the results of previous audits performed based on the policy, such that the result of the audit is appended to the previous results in a new object. For example, a report may include every checksum, hash value, or hash code calculated for an object based on an audit policy over a given period of time.

In one embodiment, the directive to audit the object may include storage instructions for the result of the audit. As an option, the storage instructions may direct the object storage system to store copy of the result of the audit at multiple sites. As a particular example, the directive may cause the object storage system to store a report comprising the result of the audit as an object at three different sites. In this manner, the result of the audit may be used as an audit trail to ensure compliance with data integrity requirements, such as regulations established by various regulatory bodies and governmental agencies.

Still yet, by way of accessing the report in the object storage system, or by receiving a response from object storage system, a storage application that initiated the audit of the object may validate the integrity of the object in the object storage system. Because the storage application has offloaded the audit of the object to the object storage system, the requesting storage application does not utilize its local resources (e.g., CPU, memory, storage, network bandwidth, etc.) to validate the integrity of the object.

In various embodiments, offloading the audit of the object to the object storage system avoids the transfer of object data across a network from the object storage system to the storage application so that the storage application may audit the object, thereby eliminating the use of network bandwidth and expensive network connections. Further, because object data does not need to be transferred across a network, an audit operation performed by the object storage system may complete much quicker than if the storage application were to request the object and then perform the audit. Even more, the object storage system may be data agnostic, and able to perform the methods disclosed herein by leveraging an object interface, such as the OpenStack Object Store project, also referred to as OpenStack Swift.

Figure 3B:
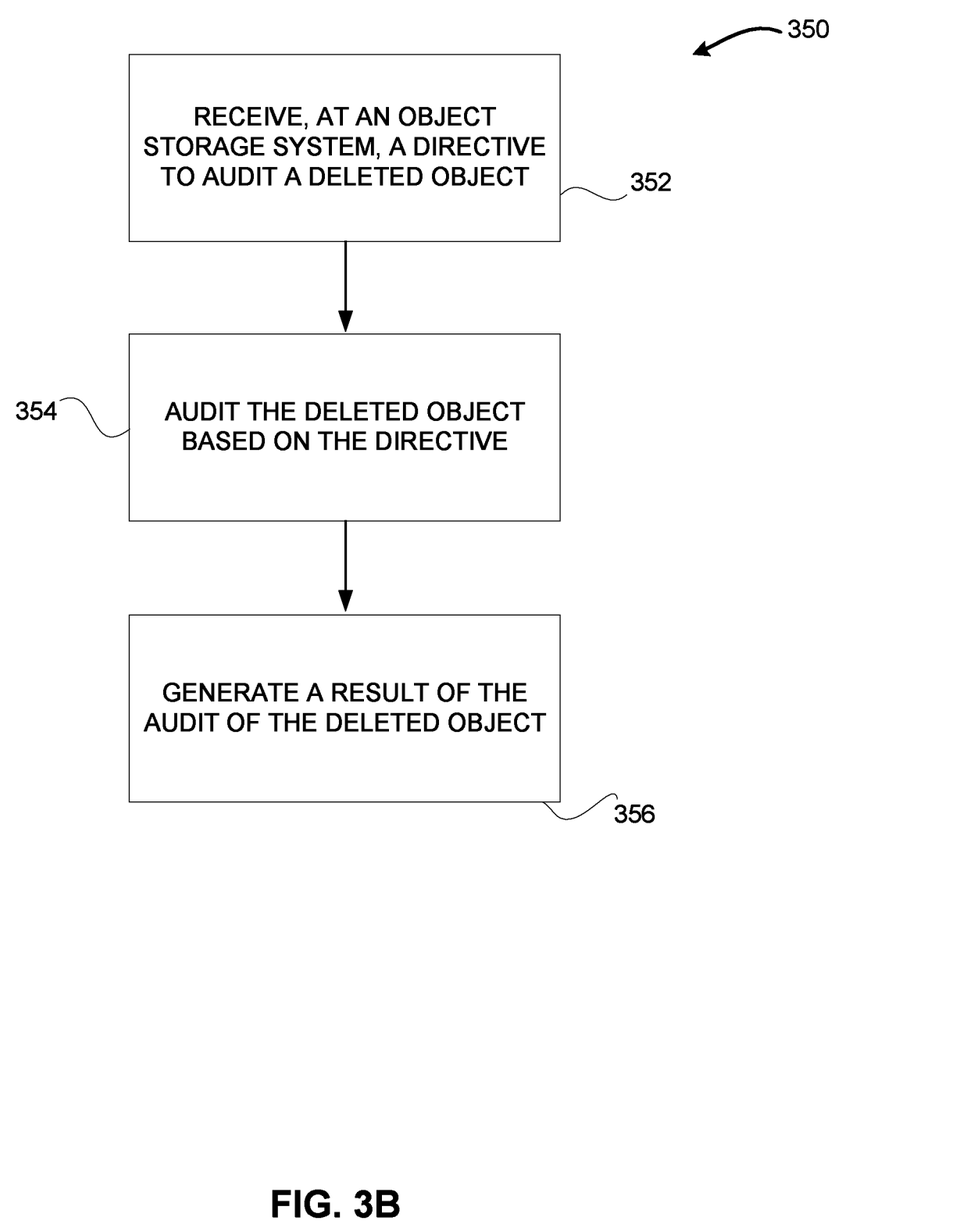
FIG. 3B depicts a method for auditing data deleted from object storage, in accordance with another embodiment of the present invention.

Now referring to FIG. 3B, a flowchart of a method 350 for auditing data deleted from object storage, is shown according to one embodiment. The method 350 may be performed in accordance with the present invention in any of the environments depicted in FIGS. 1-2, among others, in various embodiments. Of course, more or less operations than those specifically described in FIG. 3B may be included in method 350, as would be understood by one of skill in the art upon reading the present descriptions.

Each of the steps of the method 350 may be performed by any suitable component of the operating environment. For example, in various embodiments, the method 350 may be partially or entirely performed by an object storage system, or some other device having one or more processors therein. The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3B, method 350 initiates with operation 352, where an object storage system receives a directive to audit a deleted object. The object targeted by the directive may include an object that was previously stored by the object storage system but has since been deleted, or should have been deleted. In various embodiments, maintaining the integrity of an object storage system may include ensuring that objects previously requested for deletion have been successfully deleted from all sites of an object storage system. For example, if the object storage system stores an object in triplicate to three different physical media or sites, when the object is deleted, the object storage system must delete all three copies.

In some embodiments, the directive to audit the deleted object, received at operation 352, may specify one or more dates. For example, the directive to audit the deleted object may specify one or more dates of object creation. More specifically, the directive may specify a range of dates of object creation using two or more dates, specify a first date of object creation, or a last date of object creation.

Further, at operation 354, the deleted object is audited based on the directive. In embodiments where the directive to audit the deleted object simply specifies an object, then the object storage system may search for the object within the object storage system.

In one embodiment, a given object that has been deleted may be audited by the object storage system reviewing previously-generated audit reports to ensure that the object storage system has not calculated, since the given object was deleted, a unique value that matches a known unique value of the given object. In other words, the object storage system may verify that during one or more audits since the given object was deleted, the object storage has not calculated a checksum, hash value, or hash code that matches the given object. If the object storage system has calculated such a value, then the object may remain stored on one or more sites.

In embodiments where the directive to audit the deleted object specifies one or more dates, the one or more dates specified in the directive may be utilized to restrict logs that are read for auditing deletion of the object. For example, if a single date is specified in the directive, then all log entries generated since the date may be read for auditing deletion of the object.

More specifically, if the directive specifies a single date, then the object storage system may ensure that it has not calculated a checksum, hash value, or hash code that matches the object since the single date by validating that no log entry generated by the object storage system since the single date includes the checksum, hash value, or hash code of the object. As another example, the directive may specify a date range using two or more dates, and auditing the object based on the directive may include ensuring that the object storage system has not calculated a checksum, hash value, or hash code of the object during the date range by validating that no log entry generated by the object storage system during the date range includes the checksum, hash value, or hash code of the given object.

As an option, the logs read for auditing deletion of an object may include reports generated and stored in the object storage system based on previously received audit directives (e.g., a directive to audit a container, a directive to audit an account, etc.) described in the context of FIG. 3A.

As noted above, in some embodiments the directive to audit the deleted object may specify one or more dates of object creation, such as a range of dates of object creation using two or more dates, a first date of object creation, or a last date of object creation. In such embodiments, where the directive specifies one or more dates of object creation, but no particular deleted object, auditing the deleted object may include identifying objects that were created within the range of dates of object creation, before the first date of object creation, or after the last date of object creation, respectively, and then ensuring, according to the methods set forth above, that all of the identified objects have been deleted. In this manner, a storage application may ensure compliance with data storage regulations by validating that data created within a certain date range, prior to a certain date, or after a certain date, has been deleted.

In another embodiment, a given object that has been deleted may be audited by the object storage system generating a first inventory of objects stored within the object storage system, and comparing the first inventory with a second inventory of the object storage system, where the second inventory is generated in a manner different than the generation of the first inventory. For example, the first inventory may be generated by listing all objects within the object storage system, and the second inventory may be generated by listing all objects that are associated with an existing directory structure. If the comparison of the first inventory with the second inventory reveals an inventory mismatch, then one or more objects may not have been deleted as previously intended.

Still yet, at operation 356, a result of auditing the deleted object is generated. In one embodiment, the result may include providing confirmation to a storage application that the audit has completed successfully. The confirmation may be provided to the storage application via a REST API, a document (e.g., an XML document, etc.), or a socket interface. As another example, the result of the audit may comprise a report stored as a new object within the object storage system. The report may be accessible to a storage application that initiated the audit of the object. As an option, the report may include a timestamp of the audit, as well as an outcome of the audit. Such a report may be utilized to validate the removal of all copies of an object from an object storage system, thereby helping to ensure compliance with various data storage laws.

Figure 4:
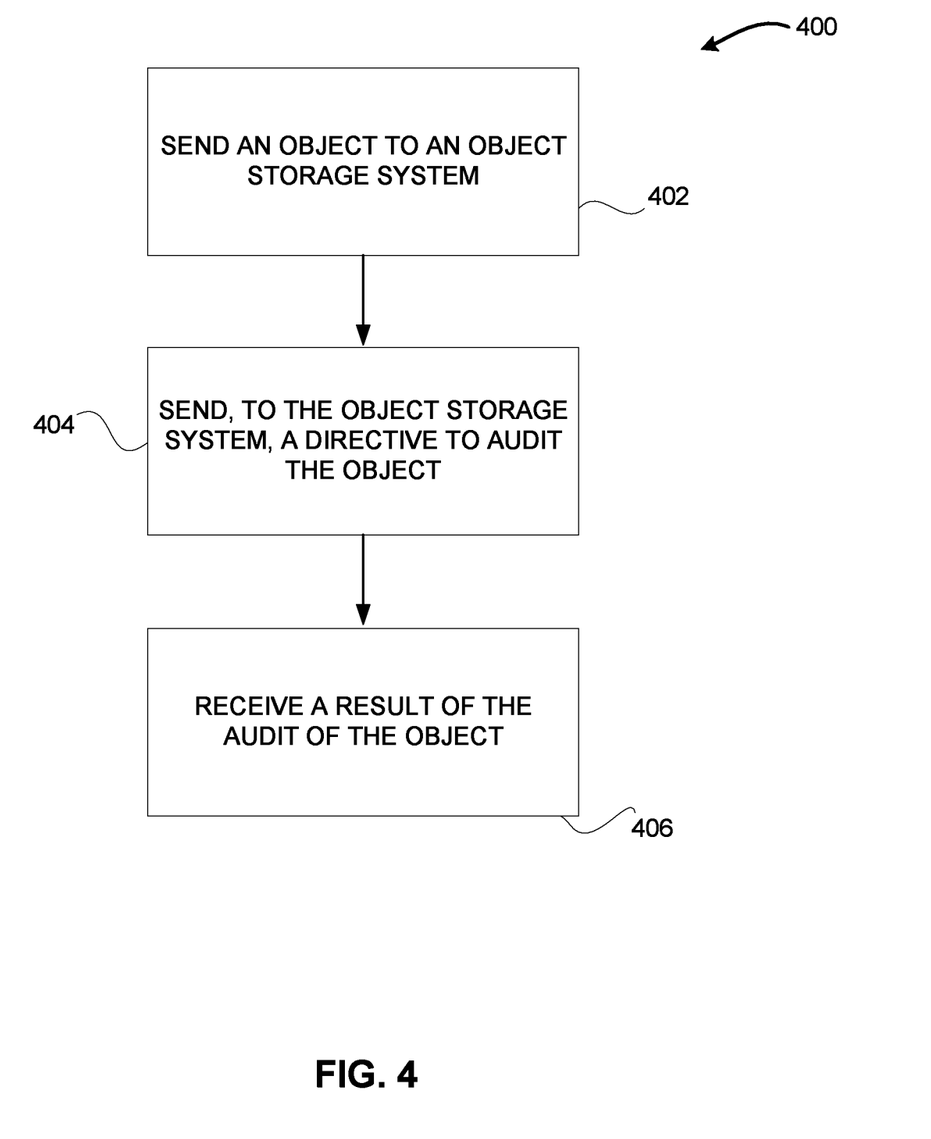
FIG. 4 depicts a method for auditing data in object storage, according to another embodiment of the present invention.

Now referring to FIG. 4, a flowchart of a method 400 for efficient auditing of data in object storage is shown according to one embodiment. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a storage application, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 initiates with operation 402, where a storage application sends an object to an object storage system, such as an object storage system hosted in the cloud computing environment 50.

As noted above, the object may be comprised of data, and metadata associated with the data. Moreover, the storage application may reside within a storage controller, a storage subsystem, a virtualized storage system, etc. In some embodiments, the storage application may include products such as IBM Storwize, IBM Spectrum Virtualize, IBM DS8000, IBM XIV, and IBM General Parallel File System (GPFS) Storage Server, etc. In a particular embodiment, the storage application comprises block storage subsystems and/or file storage subsystems that use MCStore to move data in and out of the object storage system.

Moreover, the object storage system may include an object storage service or an object storage platform. For example, in some embodiments, the object storage system may be an on-premises object storage system. In other embodiments, the object storage system may be hosted by a third-party Internet Service Provider (ISP) or cloud provider, such as Amazon.com or SoftLayer, such that the object storage system is in the cloud. Still yet, the object storage system may include OpenStack Swift, and/or cloud infrastructure, such as SoftLayer Cloud. Accordingly, the object may be sent to the object storage system utilizing known methods and procedures, such as an HTTP PUT request to Open-Stack Swift.

Additionally, at operation 404, the storage application sends, to the object storage system, a directive to audit the object. As noted above, the directive may be sent to the object storage system using a REST API, using a document, such as an XML document, or using a socket interface that is separate from an object interface utilized to transfer objects to the object storage system. Moreover, the directive to audit the object may include any command sent to the object storage system that instructs the object storage system regarding the performance of audit operations on the object. For example, as described in detail in the context of FIG. 3A, the directive may include a one-time invocation of an audit of the object; may create, modify, or delete an audit policy of the object; may direct scheduling of one or more audits of the object; and/or may direct scheduling of one or more delete audits of the object.

Further, a result of the audit of the object is received by the storage application at operation 406. As noted above, the result may be received from the object storage system that was sent the audit directive.

In one embodiment, the result of the audit may include a checksum, a hash value, or hash code of the object, or may include a result of comparing a current checksum, hash value, or hash code of the object with a previously-calculated checksum, hash value, or hash code of the object.

In another embodiment, wherein the object storage system stores multiple copies of each object, the result of the audit may include, for each copy of an object, a result of comparing a unique value calculated based on the contents of a given copy of the object with another unique value previously-calculated based on the contents of the given copy of the object. Additionally, in such embodiments, the results may include verifying that the same unique value is calculated for each of the various copies of an object.

In one embodiment, the storage application may receive the result of the audit from the object storage system via a REST API, a document (e.g., an XML document, etc.), or a socket interface.

In another embodiment, the result of the audit may comprise a report stored as a new object within the object storage system. The report may be accessible to the storage application that initiated the audit of the object. Accordingly, the storage application may receive the report by accessing the report on the object storage system. For example, the storage application may issue an HTTP GET request for the report to the object storage system.

In the manner set forth above, a storage application may ensure that there are multiple valid copies of its data stored in an object storage system of a cloud storage service. Further, the storage application may ensure that the copies of data stored in the cloud storage service comply with policies that it has defined for the data. Accordingly, the storage application may ensure the integrity of its data without wasting valuable network bandwidth and local system resources.

As an example, consider a prior art system where a storage application is creating point in time copies of a 1 TB volume 14 times each day, and sending each of the point in time copies to a cloud object storage system. In order to audit the data of the point in time copies, an object storage client would read objects back from the cloud object storage system in order to locally calculate a unique value, such as a checksum. Even at a 5% change rate, this may include reading approximately 50 GB from the cloud for each incremental backup, or 700 GB in total over the course of 14 daily backups, just to perform auditing of the transferred data. Reading the data may take hours on its own, not including performing any of the audit operations once the data has been transferred to the object storage client. Still yet, such operations may incur significant costs if reads from the cloud are billed based on the amount of data transferred.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for auditing data in object storage, the computer program product comprising a computer readable storage medium having program instructions embodied therewith, the program instructions executable by a processor to cause the processor to:
send, by the processor, an object to an object storage system;
send, by the processor to the object storage system, a directive to audit the object; and
send, by the processor to the object storage system, one or more additional directives, the one or more additional directives each being independently selected from the group consisting of:
a feedback directive to obtain feedback regarding a progress and/or a status of the audit, and
a control directive to start, pause, or stop the audit,
wherein auditing the object includes:
calculating a unique value based on contents of the object, and
triggering an eventual consistency loop in response to a determination that the calculated unique value is not the same as an expected unique value,
wherein the eventual consistency loop includes:
calculating additional unique values based on the contents of the object, and
comparing the calculated unique value to the additional unique values until determining:
the calculated unique value is identical to one of the additional unique values, and/or
an amount of time elapsed since determining the calculated unique value is not the same as the expected unique value is greater than a predetermined timeout threshold,
wherein the predetermined timeout threshold is based on:

a maximum object size of the object storage system, and a longest time expected to elapse while writing the object having the maximum object size to the object storage system.

2. The computer program product as recited in claim 1, wherein the object includes data and metadata associated with the data, wherein the directive is sent using a Representational State Transfer Application Programming Interface (REST API).

3. The computer program product as recited in claim 2, wherein the directive includes an instruction to audit:
one or more containers of the object storage system; and/or
one or more accounts of the object storage system.

4. The computer program product as recited in claim 2, wherein the directive includes instructions to audit only a specific copy of the object without auditing other copies of the object within the object storage system.

5. The computer program product as recited in claim 1, wherein auditing the object includes comparing the calculated unique value to the expected unique value, and determining whether the calculated unique value is the same as the expected unique value.

6. The computer program product as recited in claim 1, wherein the unique value includes information selected from the group consisting of: a checksum, a hash value, and a hash code.

7. A computer-implemented method, comprising:
sending an object to an object storage system;
sending, to the object storage system, a directive to audit the object; and
sending one or more additional directives, the one or more additional directives each being independently selected from the group consisting of:
a feedback directive to obtain feedback regarding a progress and/or a status of the audit, and
a control directive to start, pause, or stop the audit,
wherein auditing the object includes:
calculating a unique value based on contents of the object, and
triggering an eventual consistency loop in response to a determination that the calculated unique value is not the same as an expected unique value,
wherein the eventual consistency loop includes:
calculating additional unique values based on the contents of the object, and
comparing the calculated unique value to the additional unique values until determining:
the calculated unique value is identical to one of the additional unique values, and/or
an amount of time elapsed since determining the calculated unique value is not the same as the expected unique value is greater than a predetermined timeout threshold,
wherein the predetermined timeout threshold is based on:
a maximum object size of the object storage system, and
a longest time expected to elapse while writing the object having the maximum object size to the object storage system.

8. The computer-implemented method as recited in claim 7, wherein the object includes data and metadata associated with the data, wherein the directive is sent using a Representational State Transfer Application Programming Interface (REST API).

9. The computer-implemented method as recited in claim 8, wherein the directive includes an instruction to audit:
one or more containers of the object storage system; and/or
one or more accounts of the object storage system.

10. The computer-implemented method as recited in claim 8, wherein the directive includes instructions to audit only a specific copy of the object without auditing other copies of the object within the object storage system.

11. The computer-implemented method as recited in claim 7, wherein auditing the object includes comparing the calculated unique value to the expected unique value, and determining whether the calculated unique value is the same as the expected unique value.

12. The computer-implemented method as recited in claim 7, wherein the unique value includes information selected from the group consisting of: a checksum, a hash value, and a hash code.

13. The computer-implemented method as recited in claim 7, comprising:
receiving a result of the audit of the object.

14. A system, comprising:
a processor; and
logic integrated with the processor, executable by the processor, or integrated with and executable by the processor, the logic being configured to:
send, by the processor, an object to an object storage system;
send, by the processor to the object storage system, a directive to audit the object; and
send, by the processor to the object storage system, one or more additional directives, the one or more additional directives each being independently selected from the group consisting of:
a feedback directive to obtain feedback regarding a progress and/or a status of the audit, and
a control directive to start, pause, or stop the audit,
wherein auditing the object includes:
calculating a unique value based on contents of the object, and
triggering an eventual consistency loop in response to a determination that the calculated unique value is not the same as an expected unique value,
wherein the eventual consistency loop includes:
calculating additional unique values based on the contents of the object, and
comparing the calculated unique value to the additional unique values until determining:
the calculated unique value is identical to one of the additional unique values, and/or
an amount of time elapsed since determining the calculated unique value is not the same as the expected unique value is greater than a predetermined timeout threshold,
wherein the predetermined timeout threshold is based on:
a maximum object size of the object storage system, and
a longest time expected to elapse while writing the object having the maximum object size to the object storage system.

15. The system as recited in claim 14, wherein the object includes data and metadata associated with the data, wherein the directive is sent using a Representational State Transfer Application Programming Interface (REST API).

16. The system as recited in claim 15, wherein the directive includes an instruction to audit:

one or more containers of the object storage system; and/or one or more accounts of the object storage system.

17. The system as recited in claim 15, wherein the directive includes instructions to audit only a specific copy of the object without auditing other copies of the object within the object storage system.

18. The system as recited in claim 14, wherein auditing the object includes comparing the calculated unique value to the expected unique value, and determining whether the calculated unique value is the same as the expected unique value.

19. The system as recited in claim 14, wherein the unique value includes information selected from the group consisting of: a checksum, a hash value, and a hash code.

* * * * *